Oct. 15, 1929.   J. A. WRIGHT   1,731,961
TRAMWAY TRUCK
Filed Dec. 7, 1927   3 Sheets-Sheet 1

INVENTOR
JAMES A. WRIGHT
By
ATTORNEY

Oct. 15, 1929.  J. A. WRIGHT  1,731,961
TRAMWAY TRUCK
Filed Dec. 7, 1927  3 Sheets-Sheet 2

INVENTOR
JAMES A. WRIGHT
By
ATTORNEY.

Oct. 15, 1929.  J. A. WRIGHT  1,731,961
TRAMWAY TRUCK
Filed Dec. 7, 1927  3 Sheets-Sheet 3

INVENTOR
JAMES A. WRIGHT
By
ATTORNEY

Patented Oct. 15, 1929

1,731,961

UNITED STATES PATENT OFFICE

JAMES A. WRIGHT, OF MONTREAL, QUEBEC, CANADA

TRAMWAY TRUCK

Application filed December 7, 1927. Serial No. 238,402.

This invention relates to motor driven rail car trucks, and more particularly to the spring suspension and motor mounting of trucks of this class.

The principal object of the invention is to provide a motor driven rail car truck in which the unsprung weight is reduced to a minimum, and in which the wheels are driven through flexible axles.

A further object is to provide a truck frame in which the electric motor is housed in a novel manner, and which by means of its spring suspension results in a marked reduction of vibration and noise in operation, as well as in an increase in the durability and efficiency of the operating parts of the assembly.

A further object is to provide a truck frame in which the motor and gear reduction housing forms the main frame.

The invention consists in a frame, the central portion of which encases the motor, with forward and rearward hollow extensions which encase the gear reduction mechanism and support the bearings of the drive shafts, and also on which the transverse springs of the suspension are mounted, and side extensions on which the longitudinal springs are mounted.

The wheels, which are journalled on independent wheel carriers coupled to the ends of the springs, are driven from the drive shafts through flexible connections.

The frame is preferably constructed with upper and lower sections bolted together, whereby the assembly is readily connected up or taken down.

Reference is made to the accompanying drawings in which:—

Figure 1:
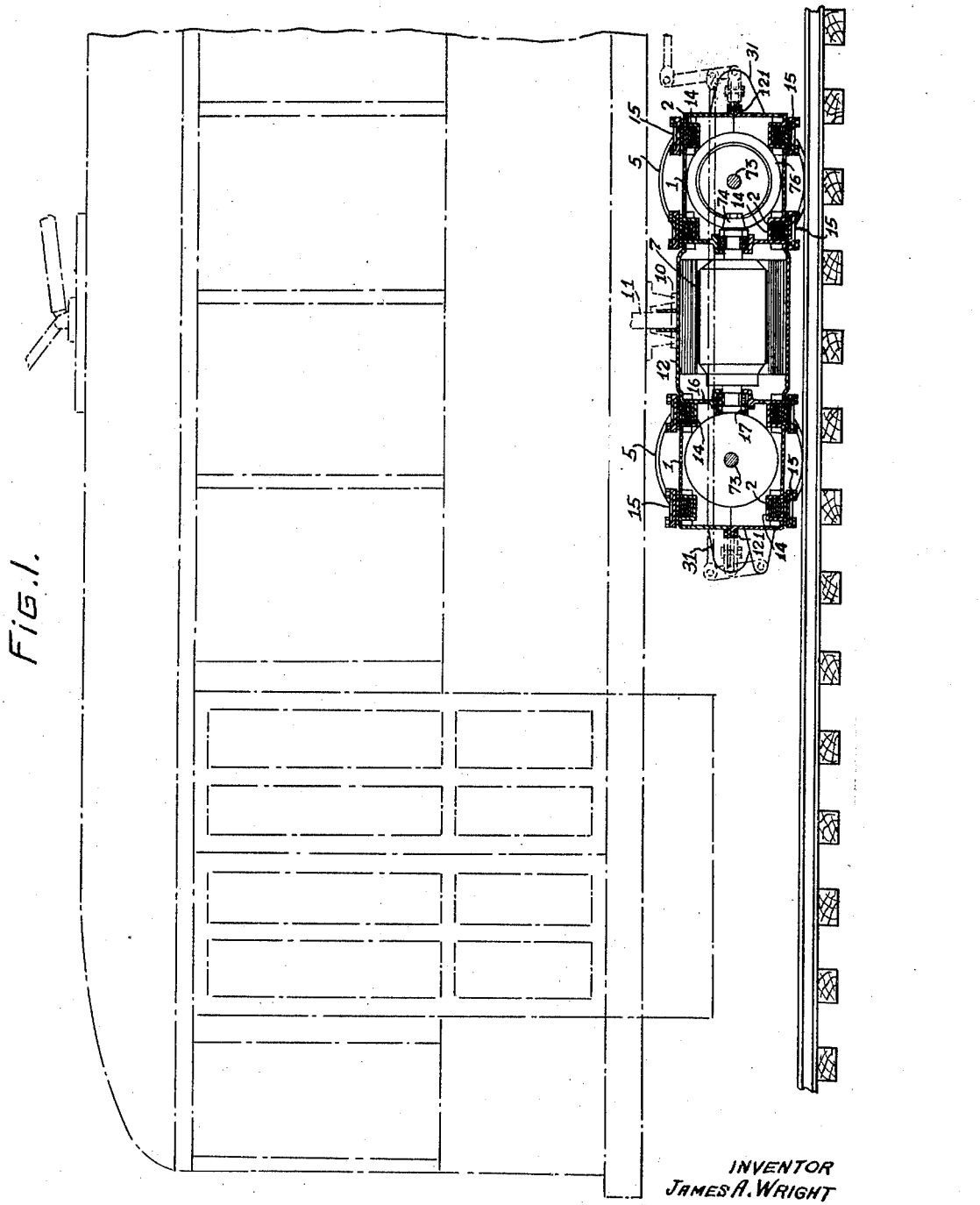
Fig. 1 is a vertical section on the line 1—1 of Fig. 3.

The frame 1 comprises three sections, the central one being enlarged to form a casing 12 in which the motor 7 is housed, and having side extensions 10—10, projecting outwardly on each side of the king pin 11 and its socket 110. The end sections have transverse seats 14, above and below in which the transverse springs 2—2 are secured by anchor plates 15—15.

The frame 1 is preferably constructed in upper and lower portions which are bolted together through the edge flanges 121, which run around the end sections and the casing 12.

Figure 2:
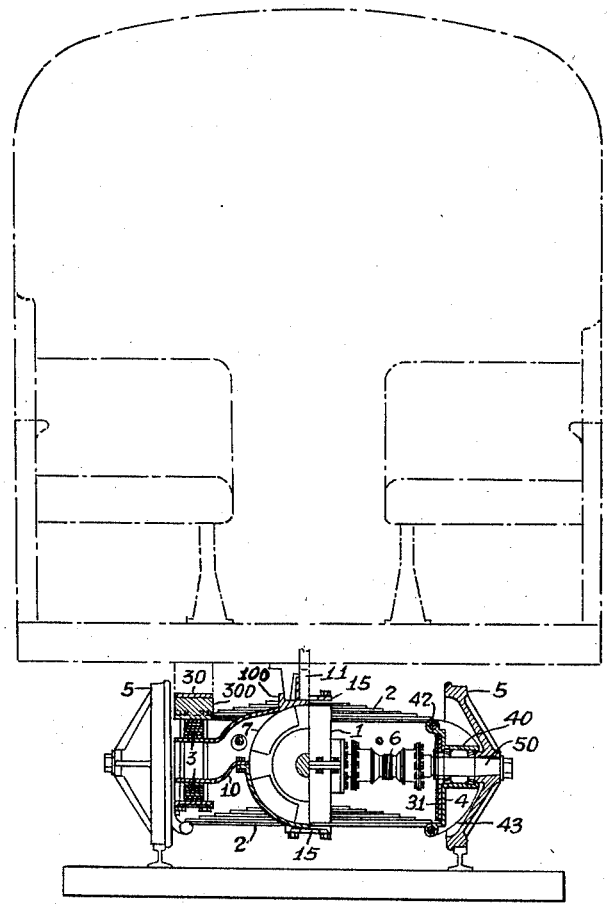
Fig. 2 is a vertical section on the line 2—2 of Fig. 3.
Figure 3:
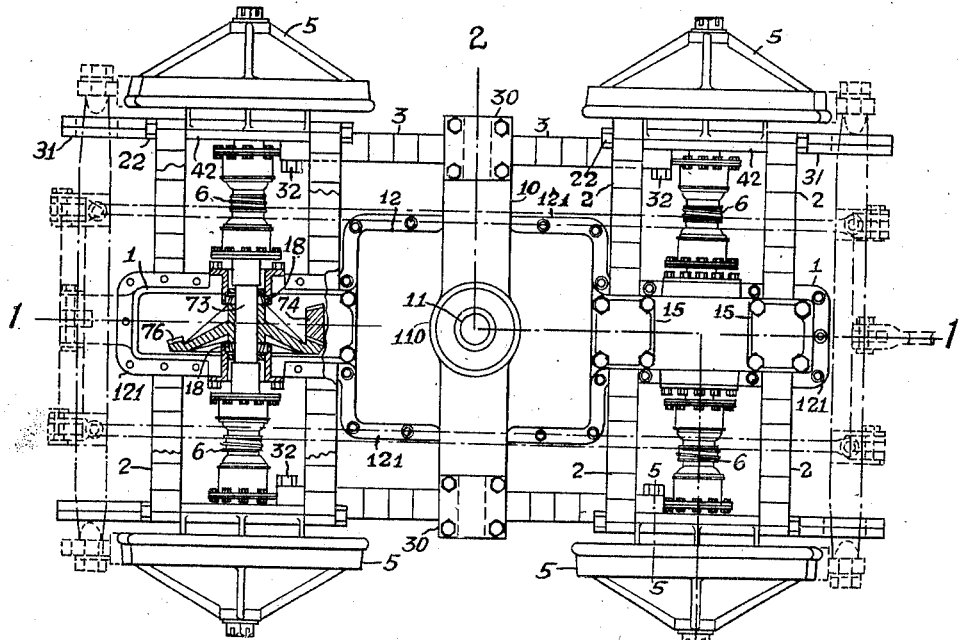
Fig. 3 is a plan view of the truck, partly in section.
Figure 4:
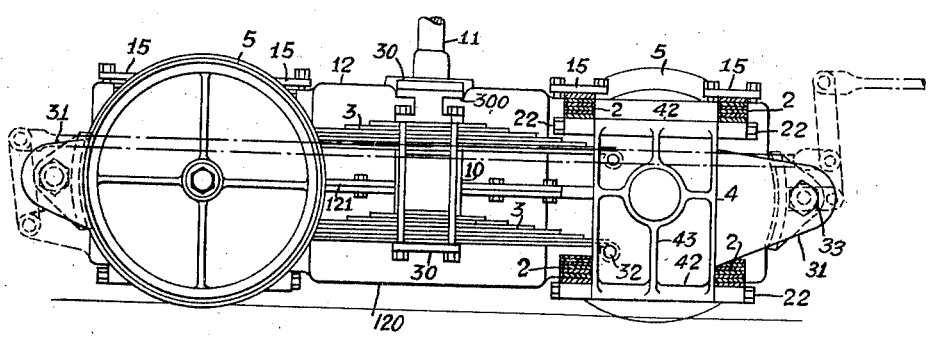
Fig. 4 is a side view of the truck with one wheel removed.
Figure 5:
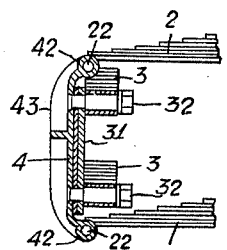
Fig. 5 is a detail section of the wheel carrier on the line 5—5 of Fig. 3.

The side extensions 10—10, as shown in Fig. 2, form downwardly offset arms extending from the upper or cover portion of the frame 1. On the end of these arms 10—10 are mounted longitudinal springs 3—3, secured thereto by anchor plates 30. The upper anchor plates 30 are enlarged to form rest blocks 300 to support the car body and resist side sway.

The end sections of the frame 1 also provide housings for the reduction gears 74—76, and their side walls support bearings 18, for the drive shafts 73.

The motor 7 is journalled in bearings 17, supported on diaphragms 16, between the central and end sections of the frame, with bevelled pinions 74, on the spindle of the motor 7, which mesh with bevelled gears 76, keyed to the driving shafts 73.

The frame 1, including its three compartments and side extensions, and the motor drive mechanism, is thus entirely supported on the series of springs 2—2 and 3—3.

The wheels 5, with their stub axles 50, are journalled on bearings in sleeves 40, of the wheel carriers 4.

The stub axles 50 are coupled to the shafts 73 by flexible connections 6 including shaft sections, which may include differential gears in certain cases and thereby provide independent wheel drive.

The wheel carriers 4 have ribs 43 and upper and lower bearings 42 for the pins 22, to which the transverse springs are coupled.

Plates 31 are riveted to the face of the wheel carriers 4 and extend towards the end of the truck, having slots 33, in which the brake beams slide.

At the inner side of the wheel carriers 4, and through the plates 31, are pins 32, projecting inwardly, to which the ends of the longitudinal springs 3—3 are coupled.

With the construction as above described, a motor driven rail car truck is provided with a frame of rigid and robust design, in which the driving mechanism is completely housed, and which can be readily opened up for repairs or replacements.

The entire frame and the driving mechanism are spring suspended on a series of parallel pairs of upper and lower springs, whereby the weight of the car body is evenly distributed to the wheels, and smooth running and absence of vibration are secured. The wheel carriers maintain the wheels in true vertical alinement with the frame and the car body thereon, while permitting free vertical movement. The brake beams sliding in the slotted extensions of the wheel carriers hold the brake shoes in proper position to the wheel on which each bears during the vertical displacement of any wheel.

What I claim is:—

1. In a motor driven rail car truck, a frame comprising a central motor casing and forward and rearward gear reduction casings, having transverse seats above and below in which the transverse springs of the spring suspension are seated.

2. In a motor driven rail car truck, the combination of a frame comprising a central motor casing having side arms projecting therefrom, and forward and rearward gear reduction casings, with transverse springs seated in the end casings and longitudinal springs mounted on the ends of the side arms, and wheels journalled on wheel carriers coupled to the ends of both series of springs.

3. In a motor driven rail car truck, the combination of a frame comprising end gear reduction casings and a central enlarged motor casing having outwardly projecting side arms, transverse springs seated in the end casings, and longitudinal springs mounted on the side arms, wheels having stub axles journalled on wheel carriers coupled to the ends of the springs, with a motor mounted in the motor casing, drive shafts journalled in the walls of the end casings, gear reduction mechanism coupling the motor to the drive shafts, and flexible couplings between the drive shafts and the stub axles of the wheels.

4. In a motor driven rail car truck, a frame comprising a central casing and two end casings, the central casing being enlarged to house a motor, formed of upper and lower sections with flanged edges, adapted to be bolted together, the upper section having outwardly projecting downwardly offset arms, transverse springs seated in the end casings and longitudinal springs mounted on the ends of the arms, and wheels journalled in wheel carriers coupled to the adjacent ends of the springs.

5. In a motor driven rail car truck, a frame comprising a central cylindrical motor casing, a motor mounted therein, with rectangular boxed casings at each end, diaphragms between the casings, bearings mounted in the diaphragms in which the motor spindle is journalled, and bearings mounted in the walls of the end casings in which drive shafts are journalled, and gear reduction mechanism coupling the motor spindle to the drive shafts.

6. In a motor driven rail car truck, a main frame comprising a central motor casing, a motor mounted therein with casings at each end, diaphragms between the casings, bearings mounted in the diaphragms in which the motor spindle is journalled, bearings mounted in the walls of the end casings in which the drive shafts are journalled, a bevel gear drive from the motor spindle to the drive shafts, wheels having stub axles, and shafts having universal joints connecting the drive shafts with the wheel stub axles.

7. In a motor driven rail car truck, a main frame comprising a central motor casing, a motor mounted therein, with casings at each end, diaphragms between the casings, bearings mounted in the diaphragms in which the motor spindle is journalled, bearings mounted in the walls of the end casings in which the drive shafts are journalled, a bevel gear drive from the motor spindle to the drive shafts, wheels having stub axles, and shafts connecting the drive shafts with the wheel stub axles.

8. In a motor driven rail car truck, a main frame comprising a central motor casing, a motor mounted therein, with casings at each end, diaphragms between the casings, bearings mounted in the diaphragms in which the motor spindle is journalled, bearings mounted in the walls of the end casings in which the drive shafts are journalled, a bevel gear drive from the motor spindle to the drive shafts, wheels having stub axles, and shafts having universal joints connecting the drive shafts with the wheel stub axles, and transverse springs above and below the end bearings connecting the main frame with the wheel carriers upon which the wheels are journalled.

JAMES A. WRIGHT.